A. ... DALSON.
Evaporating Pan.
No. 11,193.   Patented June 27, 1854.
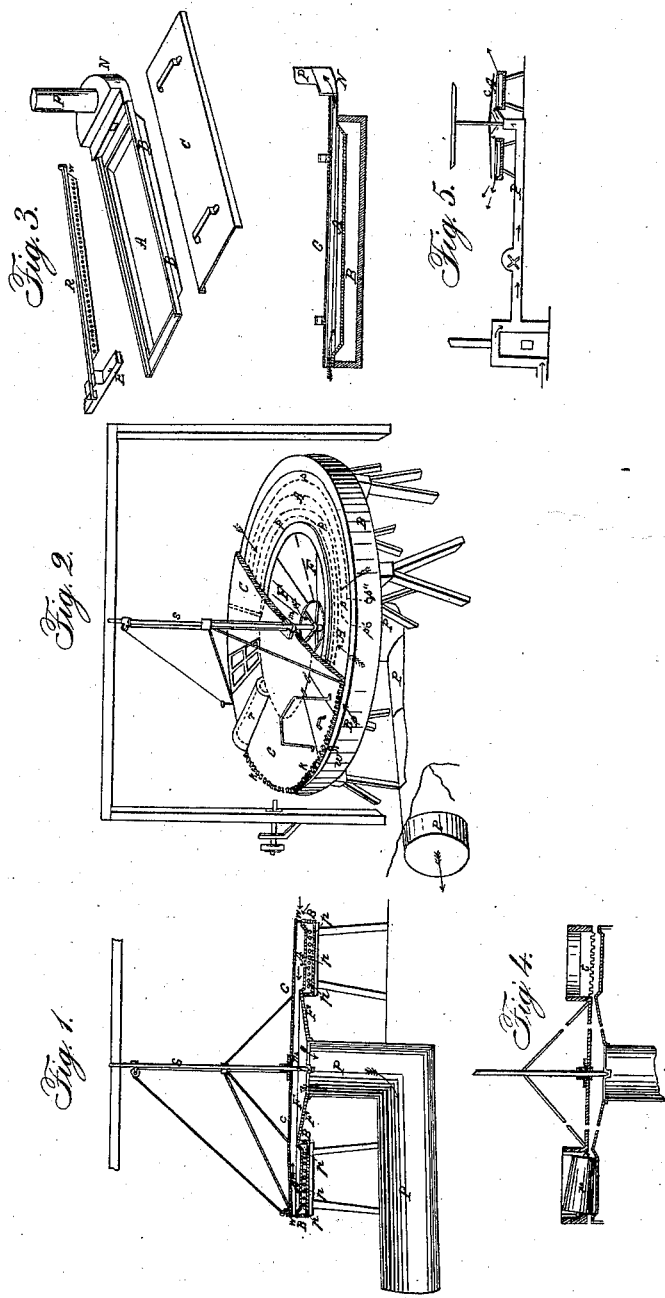

UNITED STATES PATENT OFFICE.

A. F. DALSON, OF NEW YORK, N. Y.

IMPROVEMENT IN MILK AND OTHER EVAPORATORS.

Specification forming part of Letters Patent No. 11,193, dated June 27, 1854.

*To all whom it may concern:*

Be it known that I, AUGUSTUS F. DALSON, of the city of New York, county of New York, and State of New York, have invented a new and improved apparatus for desiccating alimentary substances, as milk, eggs, chopped meats, &c., or any matters of an animal or vegetable nature which it is desired to desiccate at a modified temperature below that of boiling water and with as short as possible exposure to the atmospheric oxygen; and I do hereby declare that the following is a full and exact description thereof, reference being had to the accompanying drawings, and to the letters of reference marked thereon.

Figure 1 represents a sectional view of the apparatus. Fig. 2 is a perspective view, a portion of the cover being removed, the letters being common to both.

A A represent a circular pan of cast-iron or copper, tinned inside, and about two feet in width, the radius from the center to the inner edge being two feet, and to the outer edge of the pan four feet; depth of pan one inch. By means of flanges the pan rests on B B, which is a circular water bath, the water being heated by a steam-pipe, $p\ p$, entering the bath at $p'$, and laid under the pan in the bath, as indicated by the dotted lines in red.

C C is a revolving and circular cover. It is supported at the edges by and moves upon small wheels W W. Its center revolves upon M, a part of the shaft S S, which serves as an axis, and on which the cover may be raised and lowered by means of a rope and pulley.

In the space between the inner edges of the pan is a fan-inclined funnel-shaped floor leading to the pipe P, the latter being a wide air-pipe, through which a rapid current of air is made to pass, either by conducting it to feed the fire of a furnace (steam-boiler) or by means of a fan-wheel placed in the pipe, as shown in Fig. 5, or into a chimney-stack. The cover C is made to revolve by means of machinery applied to the cogs at the edge.

Attached to the under side of the cover is a comb, $t$, for stirring the substances during the operation of desiccation, (seen in Fig. 4,) and also a roller, $r$, same figure, for pressing, each adapted to the width of the pan.

The arrows, Fig. 1, indicate the direction of the current of air, which enters the desiccator around the outer edge of the pan, sweeping in a horizontal sheet over the surface of substance to be desiccated in the pan, and descends in the center into the pipe P.

On the upper side of the cover C are smaller covers $v$ over the stirrer and roller, which may be raised for their removal or to free them respectively from obstructions, &c.

As a modification of the circular form of pan, I have attached Drawing No. 3, representing the apparatus in a different form, likewise of my own invention.

A represents a shallow rectangular pan, fifteen inches wide, twenty-five inches long, and one inch in depth.

B is the water bath.

C is the cover, which, being placed over the pan, forms a passage through which a current of air passes into a box, N, made of sheet-tin, and thence into a pipe, P.

R is a stirring-ruler corresponding in length and depth with the pan A, in which it is moved beneath the cover to the right and left.

Having thus fully described my improved desiccator, what I claim as my invention, and desire to secure by Letters Patent, is—

The combination of the shallow pan with a rapid current of air underneath the cover and thence through the central draft-pipe, P, as seen in Fig. 1, together with the apparatus for continual stirring by means of the revolving cover and fixtures, substantially as described above, and represented in the drawings herewith attached.

AUG. F. DALSON.

Witnesses:
CHARLES ENDERLIN,
F. A. CHASE.